(12) United States Patent
Steinberg et al.

(10) Patent No.: US 10,962,038 B2
(45) Date of Patent: Mar. 30, 2021

(54) EXPANSION DOWEL HAVING A ZINC ALLOY COATING

(71) Applicant: Hilti Aktiengesellschaft, Schaan (LI)

(72) Inventors: Tanja Steinberg, Buchs (CH); Jens Kondratiuk, Buchs (CH); Arturo Guevara Arriola, Buchs (CH)

(73) Assignee: Hilti Aktiengesellschaft, Schaan (LI)

( * ) Notice: Subject to any disclaimer, the term of this patent is extended or adjusted under 35 U.S.C. 154(b) by 196 days.

(21) Appl. No.: 16/317,329

(22) PCT Filed: Jun. 27, 2017

(86) PCT No.: PCT/EP2017/065863
§ 371 (c)(1),
(2) Date: Jan. 11, 2019

(87) PCT Pub. No.: WO2018/010952
PCT Pub. Date: Jan. 18, 2018

(65) Prior Publication Data
US 2019/0301507 A1 Oct. 3, 2019

(30) Foreign Application Priority Data
Jul. 15, 2016 (EP) .................................. 16179695

(51) Int. Cl.
*F16B 13/06* (2006.01)
*C25D 7/00* (2006.01)

(52) U.S. Cl.
CPC ............ *F16B 13/065* (2013.01); *C25D 7/003* (2013.01); *F16B 13/066* (2013.01)

(58) Field of Classification Search
CPC ....... F16B 13/065; F16B 13/066; C25D 7/003
(Continued)

(56) References Cited

U.S. PATENT DOCUMENTS 3,974,734 A * 8/1976 Machtle ................ F16B 13/068
411/26
4,536,115 A * 8/1985 Helderman ........... B25B 27/143
411/17

(Continued)

FOREIGN PATENT DOCUMENTS

CM 105705804 6/2016
CM 105765240 7/2016
(Continued)

OTHER PUBLICATIONS

International Search Report of PCT/EP2017/065863, dated Oct. 24, 2017.
(Continued)

*Primary Examiner* — Gary W Estremsky
(74) *Attorney, Agent, or Firm* — Davidson, Davidson & Kappel, LLC

(57) ABSTRACT

An expansion dowel is provided, which includes at least one dowel body and a bolt, the bolt including an expansion body, which forces the dowel body radially to the outside when the expansion body is displaced in an extraction direction relative to the dowel body, a corrosion protection layer and an antifriction layer covering the corrosion protection layer being provided on the expansion body. It is also provided that the corrosion protection layer is a Zn/Ni coating or a Zn/Fe coating. A manufacturing method for an expansion dowel of this type is also provided.

18 Claims, 1 Drawing Sheet

(58) Field of Classification Search
USPC .......................................................... 411/60.1
See application file for complete search history.

(56) References Cited

U.S. PATENT DOCUMENTS

| | | | |
|---|---|---|---|
| 4,746,408 A | | 5/1988 | Hyner et al. |
| 4,940,372 A | | 7/1990 | Fischer |
| 5,176,481 A | * | 1/1993 | Schiefer ................ F16B 13/065 411/60.1 |
| 5,211,512 A | * | 5/1993 | Frischmann .......... F16B 13/065 405/259.4 |
| 5,417,776 A | | 5/1995 | Yoshino et al. |
| 7,442,286 B2 | * | 10/2008 | Capper .................. C25D 3/565 205/246 |
| 7,744,320 B2 | * | 6/2010 | Kobetsky ................ G01N 3/32 411/60.1 |
| 8,491,244 B2 | | 7/2013 | Kobetsky et al. |
| 9,428,823 B2 | * | 8/2016 | Shibao .................. B32B 15/013 |
| 9,541,116 B2 | * | 1/2017 | Cabaj ...................... F16B 29/00 |
| 9,869,334 B2 | | 1/2018 | Gstach et al. |
| 9,933,002 B2 | | 4/2018 | Gstach et al. |
| 9,970,465 B2 | | 5/2018 | Gstach et al. |
| 10,018,213 B2 | | 7/2018 | Gstach et al. |
| 2004/0062873 A1 | * | 4/2004 | Jung ........................ C09D 7/67 427/407.1 |
| 2004/0096288 A1 | | 5/2004 | Haug et al. |
| 2006/0099429 A1 | * | 5/2006 | Domes ................ C09D 133/02 428/447 |
| 2008/0050195 A1 | | 2/2008 | Wieser et al. |
| 2009/0032145 A1 | * | 2/2009 | Diaddario, Jr. ......... C23C 22/40 148/264 |
| 2009/0074538 A1 | | 3/2009 | Richie |
| 2013/0195580 A1 | | 8/2013 | Kast et al. |
| 2018/0180081 A1 | | 6/2018 | Gstach |
| 2018/0313491 A1 | * | 11/2018 | Verleene .............. C10M 107/44 |

FOREIGN PATENT DOCUMENTS

| | | |
|---|---|---|
| CN | 1032159 C | 2/1993 |
| CN | 203412878 U | 1/2014 |
| CN | 105658965 B | 6/2016 |
| DE | 3924133 A1 | 1/1991 |
| DE | 4225869 A1 | 2/1994 |
| DE | 19522026 A1 | 12/1996 |
| DE | 19716926 A1 | 10/1998 |
| DE | 10118374 A1 | 10/2002 |
| DE | 10248664 A1 | 4/2004 |
| DE | 202004001155 U1 | 6/2005 |
| DE | 102007057160 A1 | 6/2009 |
| EP | 0429880 A2 | 6/1991 |
| EP | 0514342 A1 | 11/1992 |
| EP | 0523298 B1 | 1/1995 |
| EP | 2339186 B1 | 6/2013 |
| EP | 2876312 A1 | 5/2015 |
| EP | 3 104 025 A1 | 12/2016 |
| JP | 201378784 A | 5/2013 |
| JP | 2013521445 A | 6/2013 |
| JP | 2013224711 A | 10/2013 |
| SU | 1379506 A1 | 3/1988 |
| SU | 1664120 A3 | 7/1991 |

OTHER PUBLICATIONS

Surface Treatment Technical Manual, Revised Edition, Hu Chuanxin, pp. 184-188, Beijing University of Technology Press, Jul., 2009.

"Latest User Manual of New Technology & Process of Nickel Plating, Nickel Plating Additive Formula Design and Nickel Plating Equipment Operation & Maintenance", vol. 3, Editorial Board of this book, pp. 1311-1327, Science and Technology Press, Nov. 2007.

* cited by examiner

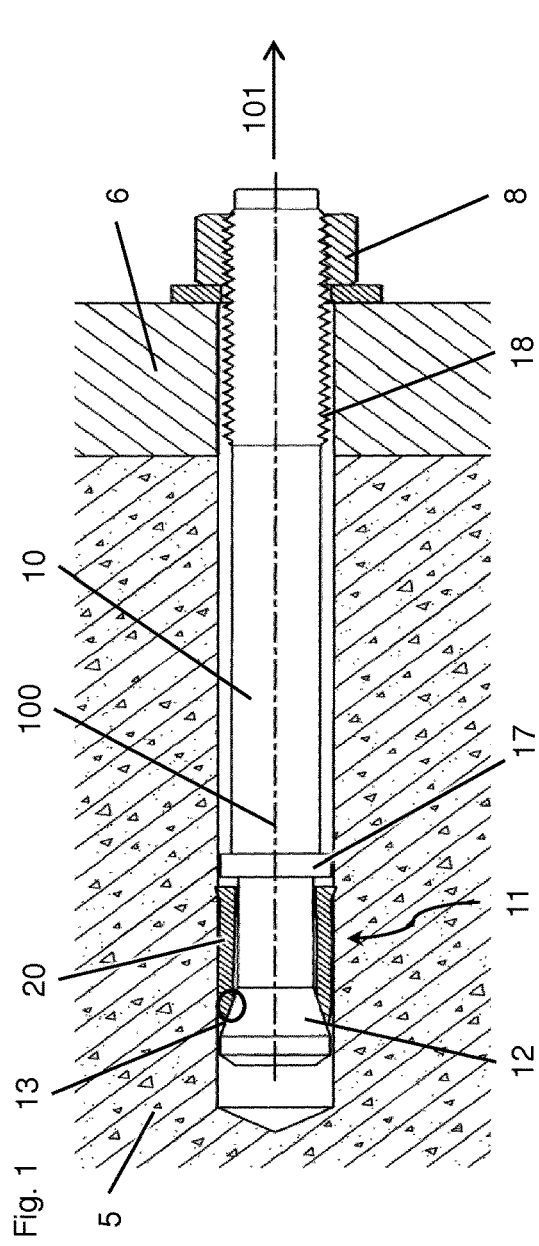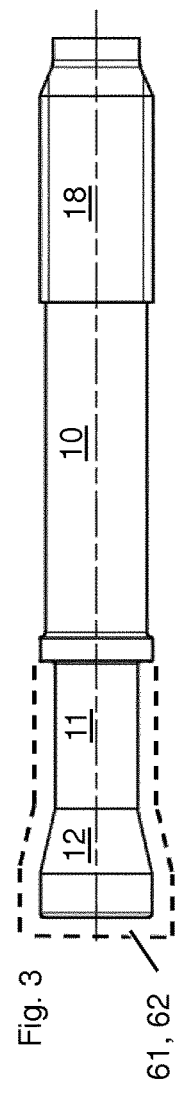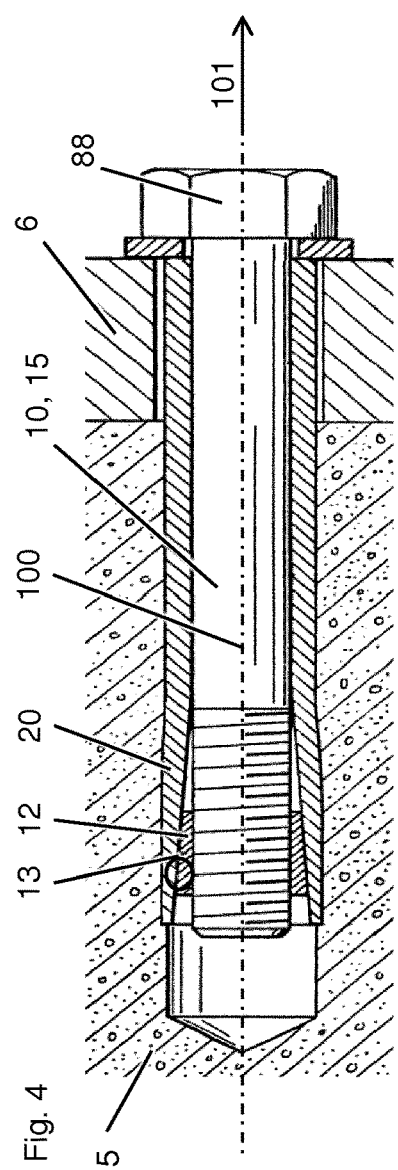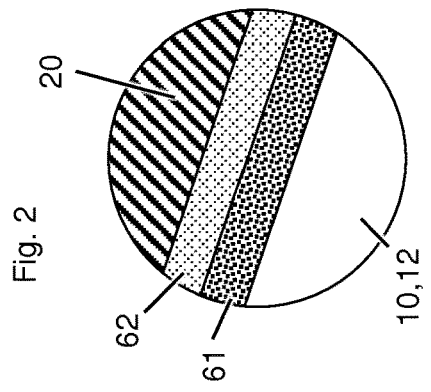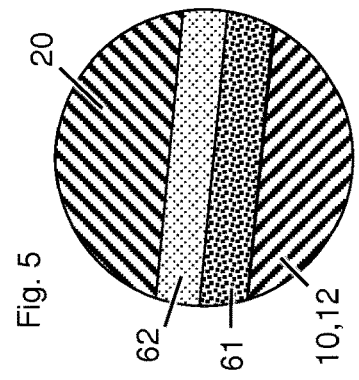

EXPANSION DOWEL HAVING A ZINC ALLOY COATING

The present invention relates to an expansion dowel. An expansion dowel of this type is designed to include at least one dowel body, which is preferably designed as an expansion sleeve, and a bolt, the bolt including an expansion body, preferably an expansion cone, which forces the dowel body radially to the outside when the expansion body is displaced in an extraction direction relative to the dowel body, a corrosion protection layer and an antifriction layer covering the corrosion protection layer being provided on the expansion body, in particular in a contact area for the dowel body. The present invention furthermore relates to a method for manufacturing an expansion dowel.

BACKGROUND

Expansion dowels are known, for example, from EP 0514342 A1. They are inserted into a drilled hole in a substrate of a component, e.g. a wall or a ceiling. By drawing an expansion cone provided on the bolt into a dowel body designed as an expansion sleeve, the dowel body is expanded radially and forced to the outside, and the expansion dowel is anchored thereby in the substrate. According to EP 0514342 A1, a friction-reducing coating is provided in the contact area between the expansion cone and the dowel body.

EP 0429880 A2 relates to a method for the corrosion-protective coating of dowels, in particular drive-in dowels for building facades by applying a zinc-containing protective layer, including the following steps: mechanical cleaning of the dowel surface and/or applying a primer to the dowel surface and drying; mechanically applying at least one layer of a zinc-containing, organic coating material; drying each applied zinc-containing layer; applying an organic protective layer; and drying the organic protective layer.

The EP 3 104 025 A1 relates to an expansion anchor, in which a double coating having an inner layer and an outer layer covering the inner layer is provided in the expansion area, the outer layer having a friction coefficient with respect to the adjacent element which is greater than a friction coefficient of the inner layer with respect to the adjacent element.

U.S. Pat. No. 8,491,244 B2 describes an expansion dowel, in which an expansion sleeve element is coated with tin zinc.

EP 0523298 B1 shows a bolt made from an austenitic stainless steel, whose surface layer is formed as a nitrated layer and is then covered by a metal covering, for example a nickel zinc coating.

U.S. Pat. No. 4,746,408 A describes a multilayer coating for bolts, which has, in particular, a zinc nickel layer and an organic cover layer.

DE 202004001155 U1 discloses a wheel bolt in the automotive area, which has an outer surface formed by a zinc nickel alloy coating applied by electroplating as well as an additional silicatic antifriction coating.

DE 3924133 A1 shows an expansion dowel, in which the expansion elements are hot-dip galvanized.

US 20080050195 A describes an expansion dowel, in which the surface roughness of the expansion sleeve increases in the direction of the rear end of the expansion dowel.

DE 4225869 A1 describes a dowel made from stainless steel, in which the surfaces subjected to a surface pressure are provided with an anti-jamming coating. A coating may be formed, in particular, by galvanization or nitrating, and an additional layer made from antifriction varnish, wax or grease is optionally applied.

DE 10118374 A1 describes a method for manufacturing an expansion anchor, which includes a cone provided with an antifriction coating on its front end, the surface of the cone being processed with the aid of steel brushes prior to applying the antifriction coating in such a way that parallel-running grooves are created.

DE 19716926 A1 discloses an expansion anchor, which has a coating in the form of a heat-shrinkable tubing.

An expansion anchor is derived from EP 2876312 A1, in which the friction coefficient of the friction between the expansion body and the dowel body is direction-dependent.

EP 2339186 B1 shows an anchor bolt, which includes a wedge member formed from a material having a Vickers hardness between approximately 218 HV and approximately 290 HV, and which includes a sleeve element formed from a material having a Vickers hardness between approximately 218 HV and approximately 290 HV.

DE 102007057160 A1 proposes, in an expansion anchor, to insert a sliding ring into an annular step at the transition from the shaft to the expansion body, which is intended to prevent a scoring of the expansion sleeve on the expansion body.

DE 10248664 A1 shows an expansion anchor made from high-grade steel, in which the expansion section includes craters at least in areas.

DE 19522026 A1 discloses an expansion anchor having an intermediate layer between the expansion body and the dowel body, which is formed from a strip of smooth foil and is undetachably fixed between the expansion body and the dowel body.

SUMMARY OF THE INVENTION

It is an object of the present invention to provide an easy-to-manufacture and simultaneously particularly reliable and powerful expansion dowel having many different uses as well as a method for its manufacture.

An expansion dowel according to the present invention has a corrosion protection layer that is characterized in that the corrosion protection layer is a Zn/Ni coating or a Zn/Fe coating.

According to the present invention, a zinc alloy coating is used as the corrosion protection layer, in particular a zinc/nickel coating (Zn/Ni coating) or a zinc/iron coating (Zn/Fe coating), a zinc/nickel coating being preferable for reasons of its still usable hardness, among other things. Within the scope of experiments, it was surprisingly observed that corrosion protection layers of this type may significantly increase the performance of expansion dowels, due to two equally advantageous effects.

On the one hand, a kind of denting of the corrosion protection layer and a wear associated therewith, due to a kind of lateral displacement of the antifriction layers situated thereover, was frequently observed under elevated surface pressures, which may occur when dowels are stressed, possibly resulting in an undesirable friction behavior. In contrast, the corrosion protection layers designed according to the present invention as a Zn/Ni coating or a Zn/Fe coating are comparatively hard. In particular, in contrast to galvanic coatings made from pure zinc, in which a hardness of less than 100 HV is frequently achieved, a hardness in the range, for example, between 350 HV and 500 HV, preferably of approximately 425 HV, is obtained with the aid of the Zn/Ni coatings according to the present invention, i.e. a hardness which is, in particular, in the area of the hardness of steel, which is typically used for the expansion body situated beneath the corrosion protection layer, or which is even greater than the hardness of this steel. Due to the comparatively high hardness of a Zn/Ni coating or Zn/Fe coating in the area of the substrate hardness or a higher hardness, in corrosion protection layers designed according to the present invention, the undesirable denting and splitting described above may be easily and effectively counteracted, so that particularly reliable and powerful dowels may be particularly easily obtained. The corrosion protection layers designed according to the present invention thus represent a particular hard and wear-resistant substrate for the overlying function coatings.

On the other hand, it was surprisingly determined that particularly slight differences between the dynamic friction coefficient and the static friction coefficients of the friction between the expansion body and the dowel body could be obtained with the aid of the Zn/Ni and Zn/Fe corrosion protection layers according to the present invention, compared to galvanic zinc coatings. This may also be advantageous for the load behavior of the dowel. After all, if the static friction coefficient is close to the dynamic friction coefficient, only a low resistance to a slipping of the dowel body on the expansion body exists, so that a particularly good re-expansion behavior exists, i.e. the dowel may reliably further expand should the load situation and/or the drilled hole dimensions change, for example in cracked concrete. According to the present invention, particularly reliable and powerful dowels may be obtained also for this reason, in particular for cracked concrete. The corrosion protection layers according to the present invention thus also represent particular good friction bases for defined friction coefficients even under high surface pressures.

The antifriction layer covers the corrosion protection layer to the outside, i.e. the corrosion protection layer is situated between the antifriction layer and the expansion body carrying the layers. The corrosion protection layer may be situated directly on the expansion body, i.e. without an intermediate layer. However, one or multiple intermediate layers may also be provided between the corrosion protection layer and the expansion body. The antifriction layer may be situated directly on the corrosion protection layer, i.e. without an intermediate layer. However, one or multiple intermediate layers may also be provided between the antifriction layer and the corrosion protection layer. In particular, the corrosion protection layer may have a passivation layer, preferably a chromium(III) passivation layer, on its side facing the antifriction layer.

The nickel content in the Zn/Ni coating and the iron content in the Zn/Fe coating are preferably 8% to 18% by weight, in particular 10% to 16% by weight. If the content is too high, the coating may become too brittle, whereby the adhesion properties may suffer. If the content is too low, the corrosion protection may suffer.

According to the present invention, the dowel body is movably situated along the bolt, in particular fastened to the bolt. To the extent that "radial" and "axial" are mentioned, this applies, in particular, to the longitudinal axis of the bolt and/or the expansion dowel, which may be, in particular, the axis of symmetry and/or the center axis of the bolt or the expansion dowel. The expansion dowel may be, in particular, a heavy-duty expansion dowel.

According to the present invention, the dowel body is forced by the expansion body radially to the outside and pressed against the drilled hole wall in the substrate when the expansion body is axially displaced in the extraction direction of the bolt relative to the dowel body. During this operation, which is effectuated, in particular, by a bevel provided on the expansion body, and in which the dowel body, which is preferably designed as an expansion sleeve, may also be expanded, the expansion dowel is anchored in the drilled hole. The extraction direction preferably runs in parallel to the longitudinal axis of the bolt and/or points out of the drilled hole. In particular, the distance of the surface of the expansion body from the longitudinal axis of the bolt increases on the expansion body against the extraction direction.

The corrosion protection layer according to the present invention and the antifriction layer according to the present invention are provided at least in a contact area between the expansion body and the dowel body, i.e. in particular in an area in which the dowel body abuts the expansion body in such a way that the expansion body may act against the dowel body and force the latter radially to the outside. The layers according to the present invention may also extend beyond the contact area and also extend over the entire bolt, which may have manufacturing advantages, among other things. In particular, the layers according to the present invention may also extend to a rear load receiving device, in particular a rear male thread of the bolt.

It is particularly preferred that the corrosion protection layer has a hardness between 350 HV and 500 HV. In this hardness range, the positive effects explained above are particularly effective, in particular if the expansion body is made from steel.

In particular, it may be provided that the Zn/Ni coating is a Zn/Ni coating deposited from an alkaline electrolyte. Particularly uniform layer thicknesses may be particularly easily obtained hereby, which, in turn, may be advantageous for a particularly homogeneous friction behavior.

The dowel body and/or the bolt, in particular the expansion body of the bolt, are preferably made from a metal material, in particular from steel. It is thus particularly preferable that the expansion body is made from steel, preferably from C steel.

The antifriction layer may advantageously be a water-based antifriction varnish, in particular an alkyd resin varnish.

It is particularly advantageous that the dowel body is an expansion sleeve which surrounds the bolt, at least in areas, and/or that the expansion body is an expansion cone. A particularly uniform introduction of force in the circumferential direction is achieved hereby. The angular extension of the expansion sleeve around the longitudinal axis of the bolt is at least 270°. According to the present invention, the expansion cone is provided to expand the expansion sleeve, i.e. to radially spread the expansion sleeve apart. One dowel body or also multiple dowel bodies, and a corresponding number of expansion bodies, may be provided. The expansion cone may have a mathematically strictly conical surface, although this is not necessary.

According to the present invention, the bolt may include a load receiving device, which may be designed, in particular as a male thread, as a female thread or as a head. The load receiving device is used to introduce tensile forces into the expansion dowel, which are oriented in the extraction direction. The expansion body is advantageously situated in a first end area of the bolt, and the load receiving device is situated in an opposite second end area of the bolt. In particular, the direction vector of the extraction direction of the expansion body may be oriented toward the load receiving device. The distance of the surface of the expansion body from the longitudinal axis of the bolt preferably increases as the distance from the load receiving device increases.

The expansion dowel is preferably a bolt-type expansion dowel. In an expansion dowel of this type, the expansion body is drawn into the dowel body when the dowel is set, due to an axial movement of the bolt relative to the dowel body. In a bolt-type expansion dowel, the bolt preferably has a one-piece design; in particular, the expansion body is designed to form a single piece with adjacent bolt areas. A stop, for example an annular shoulder, may preferably be formed on the bolt, which limits a displacement of the dowel body away from the expansion body.

Alternatively, the expansion dowel could be a sleeve-type expansion dowel. In a sleeve-type expansion dowel, the bolt includes an anchor rod which is separate from the expansion body, the expansion body preferably being connected to the anchor rod via corresponding threads. The drawing of the expansion body into the dowel body when setting the dowel may then be preferably at least partially effectuated by a rotation of the anchor rod relative to the expansion body, which is converted into an axial movement of the expansion body relative to the anchor rod by a spindle drive, which is formed by the corresponding threads. In a sleeve-type expansion dowel, in particular, the dowel body, which may also have a multi-part design, may also extend up to the mouth of the drilled hole.

The present invention also relates to a method for manufacturing an expansion dowel according to the present invention, in which the corrosion protection layer is deposited by electroplating, in particular from an alkaline bath. After the corrosion protection layer is deposited by electroplating, the antifriction layer may be applied, for example in a dipping process, in particular in a centrifuged hot-dip galvanizing process. After the corrosion layer has been deposited by electroplating and before the antifriction layer is applied, the corrosion protection layer is preferably passivated, in particular Cr(III)-passivated.

BRIEF DESCRIPTION OF THE DRAWINGS

The present invention is explained in greater detail below on the basis of preferred exemplary embodiments, which are represented schematically in the attached figures, it being possible, in principle, to implement individual features of the exemplary embodiments illustrated below individually or in an arbitrary combination within the scope of the present invention. The following are illustrated schematically:

FIG. 1 shows a partially longitudinal sectional view of an expansion dowel according to the present invention, set in a concrete substrate, according to a first specific embodiment;

FIG. 2 shows a detailed view of the expansion dowel from FIG. 1 at the location marked with a circle in FIG. 1 in the contact area between the expansion body and the dowel body;

FIG. 3 shows a side view of the bolt of an expansion dowel in a modification of the specific embodiment in FIGS. 1 and 2;

FIG. 4 shows a partially longitudinal sectional view of an expansion dowel according to the present invention, set in a concrete substrate, according to another specific embodiment; and FIG. 5 shows a detailed view of the expansion dowel from FIG. 4 at the location marked with a circle in FIG. 4 in the contact area between the expansion body and the dowel body.

DETAILED DESCRIPTION

Identical elements or elements having similar functions are identified by the same reference numerals in the figures.

FIGS. 1 and 2 show a first exemplary embodiment of an expansion dowel according to the present invention. As illustrated, in particular, in FIG. 1, the expansion dowel includes a bolt 10 and a dowel body 20 designed as an expansion sleeve, which surrounds bolt 10. Bolt 10 has a neck area 11 with a constant cross section and, following neck area 11, in the front end area of bolt 10, an expansion body 12 designed as an expansion cone for dowel body 20, on which the surface is designed as a bevel 13. Bevel 13 in this case has a rotationally symmetric design. Due to bevel 13, bolt 10 expands on expansion body 12 from neck area 11 in the direction of its front end. On the side of neck area 11 facing away from expansion body 12, bolt 10 has a stop 17, designed, for example, as an annular shoulder, for dowel body 20 designed as an expansion sleeve. Bolt 10 is provided with a male thread 18 for a nut 8 in its rear end area opposite expansion body 12.

When the expansion dowel is set, bolt 10 is pushed into a drilled hole in substrate 5 from FIG. 1 against extraction direction 101 in parallel to longitudinal axis 100 of bolt 10, leading with expansion body 12. Due to stop 17, dowel body 20 designed as an expansion sleeve is also introduced into the drilled hole. Thereafter, bolt 10 is extracted again a short distance from drilled hole in extraction direction 101, which runs in parallel to longitudinal axis 100, for example by tightening nut 8. Due to its friction with the drilled hole wall, dowel body 20 designed as an expansion sleeve remains behind, and a displacement of bolt 10 relative to dowel body 20 occurs. During this displacement, expansion body 12 of bolt 10 penetrates deeper and deeper into dowel body 20 in such a way that dowel body 20 is radially expanded by expansion body 12 and is pressed against the wall of the drilled hole. Due to this mechanism, the expansion dowel is fixed in substrate 5. FIG. 1 shows the set state of the expansion dowel, in which it is fixed in substrate 5. An attachment 6 may be fixed on substrate 5 with the aid of nut 8.

As is apparent, in particular, in FIG. 2, expansion body 12 has a double coating in a contact area with dowel body 20 formed on its bevel 13, which is made up of an inner corrosion protection layer 61 and an outer antifriction layer 62, corrosion protection layer 61 being situated between antifriction layer 62 and expansion body 12, which carries the two layers 61, 62, in particular integrally bonded. Corrosion protection layer 61 is a Zn/Ni coating or a Zn/Fe coating, and antifriction layer 62 is, for example, a water-based antifriction varnish.

The double coating made up of layers 61 and 62 on expansion body 12 is described for the exemplary embodiment in FIGS. 1 and 2. As is shown in FIG. 3, the double coating—illustrated schematically and greatly enlarged by dashed lines in FIG. 3—with layers 61 and 62 may, however, additionally extend also to neck area 11 or also to the entire bolt 10, which is not illustrated.

In the exemplary embodiments in FIGS. 1 through 3, the expansion dowel is designed in each case as a so-called bolt-type expansion dowel. Another exemplary embodiment, in which the expansion dowel is designed as a so-called sleeve-type expansion dowel, is shown in FIGS. 4 and 5. In contrast to the expansion dowels from FIGS. 1 through 3, in which expansion body 12 is axially fixedly fastened to the rest of bolt 10 and, in particular, is designed as a single piece with the rest of bolt 10, bolt 10 in the exemplary embodiment in FIGS. 4 and 5 includes an anchor rod 15, which is separate from expansion body 12, i.e. anchor rod 15 and expansion body 12 are two separate parts. Expansion body 12, including bevel 13, has a female thread, which corresponds with a male thread on anchor rod 15 of bolt 10. Moreover, dowel body 20, which is designed as an expansion sleeve in the case of the expansion dowel in FIGS. 4 and 5 and which may also be segmented, extends up to the mouth of the drilled hole, and a widened head 88 having an outer polygonal structure, is rotatably fixedly situated on anchor rod 15 in the rear end area of bolt 10.

To set the expansion dowel in FIGS. 4 and 5, anchor rod 15 is preferably rotated around longitudinal axis 100 with the aid of head 88. The corresponding threads convert this rotational movement of anchor rod 15 into an axial movement of expansion body 12 relative to anchor rod 15 and thus relative to dowel body 20, which results in the retraction of expansion body 12, including bevel 13, into dowel body 20.

In the expansion dowel in FIGS. 4 and 5, expansion body 12 of bolt 10 also has a double coating in a contact area with dowel body 20 formed on bevel 13 of expansion body 12, which is made up of an inner corrosion protection layer 61 and an outer antifriction layer 62, corrosion protection layer 61 being a Zn/Ni coating or a Zn/Fe coating, and antifriction layer 62 being, for example, a water-based antifriction varnish.

What is claimed is:

1. An expansion dowel comprising:
   at least one dowel body; and
   a bolt, the bolt including an expansion body forcing the dowel body radially to the outside when the expansion body is displaced in an extraction direction relative to the dowel body; and
   a corrosion protection layer and an antifriction layer covering the corrosion protection layer being provided on the expansion body, the corrosion protection layer being a Zn/Ni coating or a Zn/Fe coating.

2. The expansion dowel as recited in claim 1 wherein the corrosion protection layer has a hardness between 350 HV and 500 HV.

3. The expansion dowel as recited in claim 1 wherein the Zn/Ni coating is a Zn/Ni coating deposited from an alkaline electrolyte.

4. The expansion dowel as recited in claim 1 wherein the expansion body is made from steel.

5. The expansion dowel as recited in claim 1 wherein the antifriction layer is a water-based antifriction varnish.

6. The expansion dowel as recited in claim 5 wherein the water-based varnish is an alkyd resin.

7. The expansion dowel as recited in claim 1 wherein the dowel body is an expansion sleeve surrounding the bolt at least in areas, and the expansion body is an expansion cone.

8. The expansion dowel as recited in claim 1 wherein the expansion dowel is a bolt-type expansion dowel.

9. A method for manufacturing an expansion dowel as recited in claim 1 wherein the corrosion protection layer is deposited by electroplating.

10. The expansion dowel as recited in claim 1 wherein the corrosion protection layer is a Zn/Fe coating.

11. The expansion dowel as recited in claim 10 wherein the iron content of the Zn/Fe coating is between 8 and 18 percent.

12. The expansion dowel as recited in claim 11 wherein the iron content of the Zn/Fe coating is between 10 and 16 percent.

13. The expansion dowel as recited in claim 1 wherein the corrosion protection layer is a Zn/Ni coating.

14. The expansion dowel as recited in claim 13 wherein the nickel content of the Zn/Ni coating is between 8 and 18 percent.

15. The expansion dowel as recited in claim 14 wherein the nickel content of the Zn/Ni coating is between 10 and 16 percent.

16. The expansion dowel as recited in claim 1 wherein the antifriction layer is directly on the Zn/Ni or the Zn/Fe coating.

17. The expansion dowel as recited in claim 1 further comprising an intermediate layer between the antifriction layer and the Zn/Ni or the Zn/Fe coating.

18. The expansion dowel as recited in claim 1 wherein the intermediate layer is a Cr(III) passivated-layer.

* * * * *